March 30, 1937. E. L. ANDERSON 2,075,258
GAS MIXING APPARATUS
Filed July 1, 1933 2 Sheets-Sheet 1
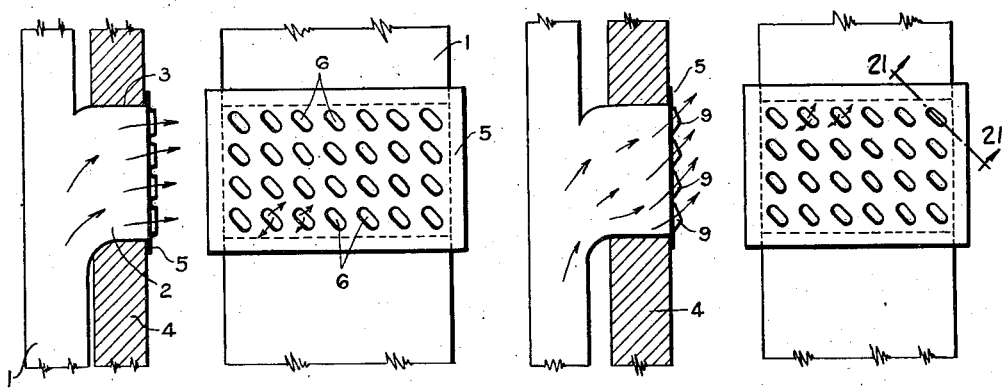
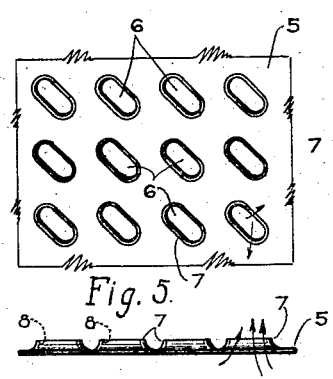
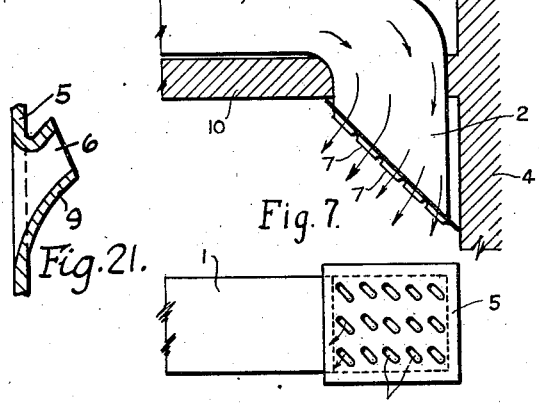
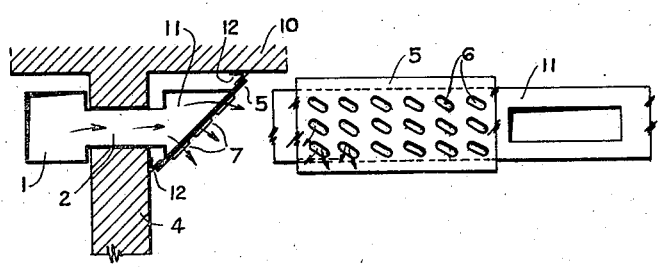
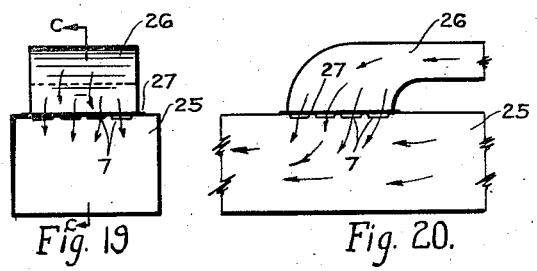
INVENTOR
Edward L. Anderson
BY
his ATTORNEY March 30, 1937.   E. L. ANDERSON   2,075,258
GAS MIXING APPARATUS
Filed July 1, 1933   2 Sheets-Sheet 2

INVENTOR
Edward L. Anderson
BY
his ATTORNEY

Patented Mar. 30, 1937

2,075,258

UNITED STATES PATENT OFFICE 2,075,258

GAS MIXING APPARATUS

Edward L. Anderson, Grosse Isle, Mich., assignor to American Blower Corporation, Detroit, Mich., a corporation of Delaware Application July 1, 1933, Serial No. 678,593

2 Claims. (Cl. 98—1)

My invention relates to new and useful improvements in an apparatus for mixing gases, and more particularly to mixing by the projection of one body of gas as a stream into another body of gas. In mixing by projection, the blending of the gases occurs due to the frictional resistance between the surfaces of the relatively moving gas bodies. With a projected stream of a given cross-sectional area the rate of mixing or blending will increase as the velocity of the projected stream is increased. The rate of mixing will also increase when a stream of a given cross-sectional area is subdivided into a plurality of smaller streams. The rapidity of mixing will also vary in accordance with the least dimension or thickness of the projected stream and will increase for a stream of a given cross-sectional area with a decrease in the thickness of the stream. It is, therefore, one object of my invention to provide an apparatus in which mixing is accomplished by the use of a plurality of projected streams.

Another object is to provide an apparatus in which the projected streams are of elongated cross-sectional area.

Another object is to provide means whereby the noise of impact of the projected stream is substantially eliminated.

The invention consists in the improved construction, to be more fully described hereinafter and the novelty of which will be particularly pointed out and distinctly claimed.

In the accompanying drawings, to be taken as a part of this specification, I have shown my invention as embodied in a plurality of different forms of apparatus, in which drawings—

Figure 1 is a side view of a duct outlet embodying the apparatus of my invention;

Fig. 2 is a view looking from right to left of Figure 1, but having a certain wall or partition means of Figure 1 removed;

Figs. 3 and 4 are views similar to Figs. 1 and 2, but having a modified form of discharge outlets or orifices;

Fig. 5 is an enlarged detail view of the duct outlet member;

Fig. 6 is a detail view in edge elevation of the member of Fig. 5;

Figs. 7 and 8 are side and front views respectively of the apparatus as applied to the corner of a room or other compartment;

Figs. 9 and 10 show the apparatus in side and front views respectively for an outlet duct extending longitudinally of the juncture between horizontal and vertical walls of a compartment or space;

Fig. 19 is a view showing the application of my apparatus to primary and secondary mixing ducts;

Fig. 20 is a view in section on the line C—C of Fig. 19, and

Fig. 21 is a detail view in section on the line 21—21 of Fig. 4.

Figure 11:
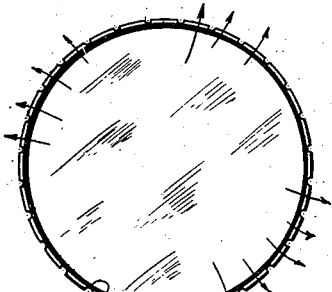
Fig. 11 is a view in section on the line A—A of Fig. 12 showing a chambered duct outlet member.

Referring to the drawings by characters of reference, 1 designates generally a duct or conduit for confining a stream of gas such, for example, as air to be employed in heating or ventilating a space or enclosure such as a room or other compartment. The duct 1 has a branch outlet duct 2 which opens through an aperture 3 in the side wall or partition 4 of the enclosed space. The outlet of the duct 2 preferably terminates flush with the inside face of the wall 4 and is provided with a closure member 5, preferably a plate of sheet metal which may be supported by the branch duct 2 or by the wall 4. The plate member 5 is provided with a plurality of obliquely positioned apertures or orifices 6 through which the gas stream is discharged into the space or compartment. The apertures 6 are preferably elongated in order to secure the maximum cross-sectional flow area while maintaining the discharge streams of small thickness in one dimension. Each of the orifices 6 is provided with a continuous surrounding lip or flange member 7 which projects from the marginal edge of each orifice in the direction of the discharging stream. The members 7 are preferably formed from the material of the plate member 5 and may be struck or punched therefrom. The members 7 are of converging cross-sectional area in the direction of flow and each serves as a discharge nozzle for its orifice. Each of the members 7 has its inside wall surface curved convexly in the direction of flow and at its terminal edge portion, as at 8, is substantially tangent to or parallel with the direction of flow so that the members 7 are streamlined.

In operation, the air or other gas supplied to the branch duct 2 will be split up into a plurality of separate streams issuing from the orifices 6. The streams which are transversely flattened by reason of the elongation of the orifices will present a greater surface area to the body of gas in the space into which they are discharged than would be the case if the streams were circular in cross-section or if only a single stream of equivalent cross-sectional area were employed, and therefore the blending of the discharged streams with the gas or atmosphere of the space will occur quickly. Due to the convergence of the inside wall surface of the members 7 and the termination of the surfaces parallel to the plane of flow, the discharging streams will not set up vibration in the body of gas into which the streams are discharged, thereby eliminating the objectionable noise which occurs from the use of a sharp edged orifice plate. The streamlining of the members 7 permits the gas to be discharged from the duct 2 at a greater velocity than would be possible with mere ports through the plate member 5, and therefore the blending of the streams with the body of gas will take place more rapidly than with the discharge of an equal volume per unit of time from the duct 2 when the members 7 are not used.

In Figs. 3 and 4, the plate orifices are surrounded by lip or flange members 8 which differ from the members 7 of Fig. 6 in that the longitudinal axes taken along the line of flow through the members 9 are inclined to the plane of the closure plate member 5. By inclining the members 9, so that they are oblique to the plane of the member 5 the direction of the discharging streams may be made at any desired angle to the plane of the wall or partition 4 and the plate member 5.

In Figs. 7 and 8, the branch duct 2 is shown as extending into the space or room adjacent a corner thereof. In order that the discharging streams may be directed away from the room corner and the adjacent walls, the branch duct 2 is terminated on a diagonal so that the closure plate member 5 is inclined to the ceiling 10 and the side wall 4. The orifices and the members 7 therefore direct the air streams toward the center of the room or space.

In the construction of Figs. 9 and 10, the branch duct 2 opens into a header 11 which extends longitudinally of the room or compartment at the juncture between the side and ceiling walls 4 and 10 respectively. One side of the header 11 is formed by the plate member 5 with the outlet orifices 6 directed diagonally into the room or compartment, as in the case of Figs. 7 and 8. In this form the plate member 5 may be secured to the enclosure walls by brackets 12, or the like, if desired.

Figure 12:
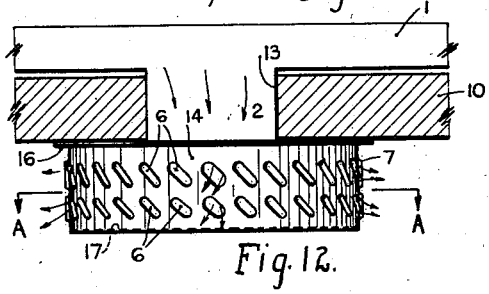
Fig. 12 is a view in side elevation of the element of Fig. 11.
Figure 16:
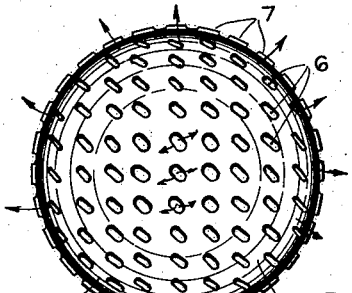
Fig. 16 is a view in section on the line B—B of Fig. 15.

In Figs. 11 and 12, the branch duct 2 is shown as opening through an aperture 13 in the ceiling of the room or compartment. The duct 2 opens into the interior of a chambered element 14 having a substantially cylindrical side wall 15 and top and bottom or end walls 16, 17 respectively, the top wall being apertured to receive duct 2. The outlet orifices or apertures 6 with their surrounding flange members 7 are provided in the cylindrical side wall 15. The apertures 6 are preferably in continuous circumferential rows which are vertically spaced from each other. In this form the air or gas entering the interior of the chambered element 14 will be discharged laterally in all directions through the orifices 6, the lip members 7 functioning as above described.

Figure 14:
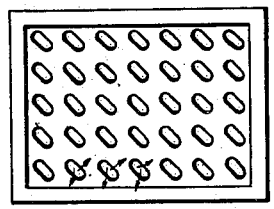
Figs. 13 and 14 are respectively side and front views of the apparatus as applied to a vertical duct outlet.
Figure 13:
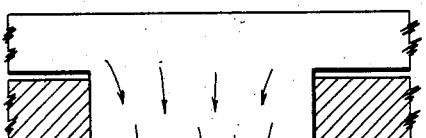

Figs. 13 and 14 show the application of the duct outlet member to a horizontal partition such as a ceiling, for example, and both the structure and operation will be obvious from the description of Figs. 1, 2, 5 and 6.

Figure 15:
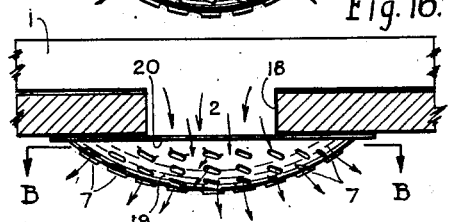
Fig. 15 is a side view of an apparatus provided with a dome-shaped outlet member.

In Fig. 15, the branch duct 2 also opens into the room or space through a ceiling aperture 18. The outlet from this branch duct 2 discharges into a dome element 19, preferably a spherical segment secured at its periphery to a wall plate 20. The curved spherical surface of the member 19 is provided with a plurality of the orifices 6 having the lip members 7 above described. In this form the orifices 6 not only direct the gas or air streams laterally or horizontally in all directions but also direct the streams both diagonally and directly downward.

Figure 17:
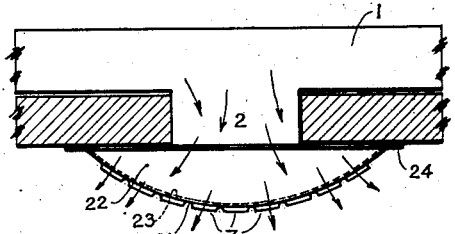
Fig. 17 is a view in side elevation of my apparatus provided with a chambered duct outlet member having a curved wall surface.
Figure 18:
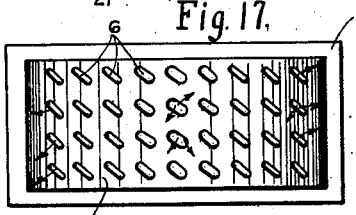
Fig. 18 is a front view of the element of Fig. 17.

Figs. 17 and 18 show a chambered element 21 which receives the air or gas discharged from the branch duct 2, and which is particularly adapted for a ceiling outlet, although it is apparent that the element 21 may be set horizontally in a side wall to project the air stream in a plane parallel to the floor. The element 21 preferably has substantially parallel side walls 22 which are circular segments having their curved or circumferential edges directed downward. The curved plate member 23 has its side edges joined to the curved margin of the side walls 22 and has its end edges secured to a ceiling plate 24 to which the side walls 22 are also joined. The curved plate 23 is provided with a plurality of rows of the apertures or orifices 6 having the lip or flange members 7 above described. In operation, this form will direct the air or gas in a substantially vertical plane but both diagonally and directly downward.

In Figs. 19 and 20, 25 designates a primary gas flow duct into which a secondary gas flow duct 26 discharges. The duct 26 preferably has its outlet opening laterally into the duct 25. The outlet is closed by a plate member 27 having the orifices and lip members 7 particularly shown in Figs. 5 and 6. In this form, the mixture is between two moving gas streams and by reason of the orifices 6 the blending of the streams takes place very rapidly. Directing of the secondary streams laterally into the duct 25 and vertically to the direction of flow of the primary stream results in a thorough mixing of the two streams.

What I claim and desire to secure by Letters Patent of the United States is:

1. In a gas mixing apparatus, a primary duct having an opening through its side wall, a secondary duct external of said primary duct having an outlet communicating with said opening, a plate member extending across said opening and closing the outlet of said secondary duct, said plate member having a plurality of discharge apertures therethrough, each of said apertures having its cross-sectional flow area converging in the direction of flow from the secondary duct toward said primary duct.

2. In a gas mixing apparatus, a primary duct having an opening through its side wall, a secondary duct external of said primary duct and having an outlet communicating with said opening, a plate member extending across said opening and closing the outlet of said secondary duct, said plate member having a plurality of discharge apertures therethrough, and a lip element surrounding each of said apertures and forming a continuation thereof, each said lip element converging in cross-sectional flow area in the direction of flow from said secondary duct toward said primary duct.

EDWARD L. ANDERSON.